US012473109B2

(12) United States Patent
Wright

(10) Patent No.: US 12,473,109 B2
(45) **Date of Patent: *Nov. 18, 2025**

(54) BANKNOTE PROCESSING

(71) Applicant: TIDEL ENGINEERING, L.P., Carrollton, TX (US)

(72) Inventor: Robert Wright, Essex (GB)

(73) Assignee: TIDEL ENGINEERING, L.P., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,043

(22) Filed: Nov. 13, 2023

(65) Prior Publication Data

US 2024/0076073 A1 Mar. 7, 2024

Related U.S. Application Data

(63) Continuation of application No. 17/332,697, filed on May 27, 2021, now Pat. No. 11,851,225, which is a (Continued)

(30) Foreign Application Priority Data

Jan. 9, 2012 (GB) ..................................... 1200239

(51) Int. Cl.
*B65B 5/06* (2006.01)
*B65B 43/32* (2006.01)
(Continued)

(52) U.S. Cl.
CPC .............. *B65B 5/067* (2013.01); *B65B 43/32* (2013.01); *E05G 1/00* (2013.01); *E05G 1/005* (2013.01);
(Continued)

(58) Field of Classification Search
CPC ......... B65B 43/26; B65B 43/32; B65B 67/04; B65B 7/00
See application file for complete search history.

(56) References Cited

U.S. PATENT DOCUMENTS 2,582,381 A 1/1952 Higginbottom
2,954,203 A 9/1960 Carter
(Continued)

FOREIGN PATENT DOCUMENTS

DE 102008061530 A1 6/2010
DE 102009053155 A1 5/2011
(Continued)

OTHER PUBLICATIONS

Advisory Action for U.S. Appl. No. 14/371,121, mailed Oct. 19, 2017, 3 pages.
(Continued)

*Primary Examiner* — Praachi M Pathak
(74) *Attorney, Agent, or Firm* — Polsinelli PC

(57) ABSTRACT

Banknote processing equipment is disclosed, which comprises a chamber having an open end for insertion of a bag into the chamber and an extractor adapted to establish a lower ambient pressure between the chamber and the hag to that within the bag to cause the bag to expand into an open configuration during a banknote filling operation, whereby the banknote processing equipment can deposit banknotes in the bag.

20 Claims, 5 Drawing Sheets

Related U.S. Application Data continuation of application No. 15/983,003, filed on May 17, 2018, now Pat. No. 11,021,277, which is a continuation of application No. 14/371,121, filed as application No. PCT/GB2012/053142 on Dec. 14, 2012, now Pat. No. 10,138,009.

(51) Int. Cl.

| | |
|---|---|
| ***E05G 1/00*** | (2006.01) |
| ***E05G 1/14*** | (2006.01) |
| ***G07D 11/00*** | (2019.01) |
| ***G07D 11/125*** | (2019.01) |

(52) U.S. Cl.

CPC ........... *E05G 1/14* (2013.01); *G07D 11/0093* (2013.01); *G07D 11/125* (2019.01)

(56) References Cited

U.S. PATENT DOCUMENTS

| | | | | |
|---|---|---|---|---|
| 4,912,906 | A * | 4/1990 | Toner | B65B 9/13 186/59 |
| 5,313,766 | A | 5/1994 | Rimondi et al. | |
| 5,771,667 | A | 6/1998 | McGregor et al. | |
| 5,987,854 | A | 11/1999 | Killinger et al. | |
| 6,112,539 | A * | 9/2000 | Colberg | G07F 11/68 62/331 |
| 7,021,027 | B2 | 4/2006 | Higer | |
| 2008/0073177 | A1 | 3/2008 | Hansson | |
| 2015/0000230 | A1 | 1/2015 | Wright | |

FOREIGN PATENT DOCUMENTS

| | | | |
|---|---|---|---|
| EP | 1369826 | A1 | 12/2003 |
| GB | 2352006 | A | 1/2001 |
| JP | 2004359284 | A | 12/2004 |
| WO | WO-2010125372 | A1 | 11/2010 |
| WO | WO-2011138594 | A1 | 11/2011 |

OTHER PUBLICATIONS

Communication pursuant to Article 94(3) EPC for European Patent Application No. 12809841.5 dated Nov. 26, 2015 (4 pages).

Communication under Rule 71(3) EPC for European Patent Application No. 12809841.5 dated Mar. 23, 2017 (5 pages).

Examination Report under Section 18(3) for United Kingdom Patent Application No. GB1200239.0 dated Nov. 7, 2014 (2 pages).

Final Office Action for U.S. Appl. No. 14/371,121, mailed Jul. 14, 2017, 12 pages.

International Preliminary Report on Patentability for PCT/GB2012/053142 mailed Sep. 16, 2013, 5 pages.

International Search Report and Written Opinion for PCT/GB/2012/053142 mailed Mar. 18, 2013, 8 pages.

Non-Final Office Action for U.S. Appl. No. 14/371,121, mailed Dec. 13, 2017, 14 pages.

Non-Final Office Action for U.S. Appl. No. 14/371,121, mailed Jan. 26, 2017, 11 pages.

Notice of Allowance for U.S. Appl. No. 14/371,121, mailed Jul. 31, 2018, 8 pages.

Notification of Grant for United Kingdom Patent Application No. GB1200239.0 dated Mar. 31, 2015 (2 pages).

Notification on the necessity of presenting additional materials for Eurasian Patent Application 201491237/31 dated May 23, 2016 (5 pages, including English translation).

Notification on the need to furnish additional materials for Eurasian Patent Application 201491237/31 dated Feb. 27, 2017 (4 pages, including English translation).

Search Report under Section 17(5) for United Kingdom Patent Application No. GB1200239.0 dated Apr. 13, 2012 (3 pages).

Summons to Attend Oral Proceedings pursuant to Rule 115(1) EPC for European Patent Application No. 12809841.5 dated Aug. 9, 2016 (4 pages).

* cited by examiner

BANKNOTE PROCESSING

CROSS-REFERENCE TO RELATED APPLICATIONS

This application is a continuation of U.S. application Ser. No. 17/332,697 filed on May 27, 2021, which is a continuation of U.S. application Ser. No. 15/983,003 filed on May 17, 2018 and issued as U.S. Pat. No. 11,021,277, which is a continuation of U.S. application Ser. No. 14/371,121 filed on Jul. 8, 2014 and issued as U.S. Pat. No. 10,138,009, which is a 35 U.S.C. § 371 national stage application of International Application No. PCT/GB2012/053142 filed on Dec. 14, 2012, which claims priority to British Patent Application Serial No. GB1200239.0 filed on Jan. 9, 2012. All of these applications are herein incorporated by reference in their entireties.

FIELD

This presently disclosed technology relates to banknote processing equipment, which can cause a bag to expand into an open configuration so that the banknote processing equipment can deposit banknotes in the bag. It also relates to a corresponding method.

BACKGROUND

In banks and retails outlets, banknotes are often sorted using specialist machinery and deposited into plastic bags. When a desired quantity of banknotes has been deposited into a bag, the bag is then sealed (for example, by heat) and collected for onward transit from the bank or retail outlet.

One problem with using bags in this way is that, with lightweight items such as banknotes, it is difficult to ensure that the banknotes fall straight to the bottom of the bag because the bag will not usually open completely without some manipulation. Typically, some special arrangement is required to allow banknotes to fall to the bottom of the bag. One such arrangement used with security documents such as banknotes is the use of a block-bottom and gusseted sides. However, these are relatively expensive to provide, and it is desirable to eliminate this expense as the bags used to transport banknotes are disposed of after each use. Furthermore, even where this arrangement is used it is normal for the bags to be supplied in a flattened configuration, requiring the user to expand the bag when installing it in the device used to deposit banknotes within it.

DETAILED DESCRIPTION

Figure 1:
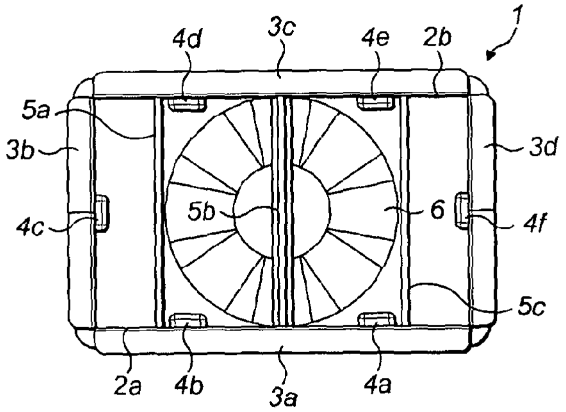
FIGS. 1 to 3 show plan, perspective and cross-sectional views of a first implementation of the presently disclosed technology.

In accordance with a first aspect of the presently disclosed technology, there is provided banknote processing equipment comprising a chamber having an open end for insertion of a bag into the chamber and an extractor adapted to establish a lower ambient pressure between the chamber and the bag to that within the bag to cause the bag to expand into an open configuration during a banknote filling operation, whereby the banknote processing equipment can deposit banknotes in the bag.

By extracting air from within the chamber and reducing the pressure around the bag, the bag is caused to expand and open. This allows the easy deposition of banknotes into the bag. Furthermore, there is no requirement to manipulate the bag to open it initially or to hold it open whilst the filling operation is carried out and a cheap and simple bag (e.g. with no block-bottom or gusseted sides) can be used. The above-mentioned problems are therefore overcome.

"Filling" means depositing a desired amount of banknotes in the bag. This does not necessarily mean that the entire volume of the bag is occupied with the banknotes.

In one implementation, the open end of the chamber is adapted to support a free end of the bag in an open position. This allows the passage of banknotes into the bag through the free end. The adaptation of the open end of the chamber to support the free end of the bag could be by way of a set of pegs or a flange on the open end of the chamber over which the free end of the bag may be stretched.

The bag may have a base or closed end opposed to the free end. Thus, the banknotes will deposit on the base or closed end.

In another implementation, the open end of the chamber is adapted to support a frame integral with the bag. Such a frame may provide a means for holding the bag and provide a closure for sealing the bag after the filling operation is complete. Such a bag and frame is explained in detail in our PCT application, published as WO2011/138594.

However, in some examples, the banknote processing equipment further comprises a clamping arrangement operable to clamp at least part of the free end of the bag against the chamber during the banknote filling operation.

To achieve this, the clamping arrangement may comprise a plurality of flaps, which are brought into engagement with inner surfaces of the bag on operation of the clamping arrangement. For example, the flaps may be rotatable or movable from a first position in which they are disengaged from the inner surfaces of the bag to a second position in which they are engaged with the inner surfaces of the bag.

In some instances, each flap has a leading edge with chamfered corners or that is curved. The leading edge is shaped in this way to prevent it catching on the bag as the flaps are brought into engagement with the inner surface of the bag.

In some instances, the banknote processing equipment further comprises a sealing mechanism movable into engagement with the bag for sealing the bag in a sealing operation occurring after the filling operation.

The sealing mechanism may be coupled to the clamping arrangement such that the clamping arrangement releases the free end of the bag as the sealing mechanism is moved into engagement with the bag to allow the bag to be sealed.

The chamber may have one or more side walls for containing expansion of the bag, in use.

When in the open configuration the bag could be in contact with the one or more side walls of the chamber. Indeed, it could conform to an interior shape of the chamber, for example defined by the side walls.

In the open configuration, the bag may occupy an interior volume of the chamber. Alternatively, it may partially occupy an interior volume of the chamber.

In an implementation, the device further comprises one or more side rails running along the length of the chamber from the open end and protruding from the side walls inwardly into the chamber. The side rails prevent the bag from conforming precisely to the interior shape of the side walls and allow the passage of air between the bag and the side walls. This prevents the extractor from being overloaded and overheating.

The banknote processing equipment may further comprise a support for holding a base of the bag, in use, during the filling operation. The support could be a mesh or one or more bars passing through chamber to support the contents of the bag during the filling operation and to prevent the bag from being drawn into the extractor.

The extractor may be a fan.

The banknote processing equipment may further comprise a speed controller adapted to control the speed of operation of the extractor in response to a speed control signal. This allows the extractor to be slowed down or even stopped during the filling operation and after expansion of the bag (i.e. when the bag has expanded into the open configuration). Despite the slower speed of operation, it has been found that the bag remains in the open configuration. This feature enables the saving of energy and lower-noise operation. The speed controller could vary the speed of operation continuously or it could vary the speed of operation to one of a plurality of discrete speed settings.

The speed controller may be adapted to control the speed of operation of the extractor to a cooling speed for cooling a welded region of the bag during and/or after the sealing operation.

In accordance with a second aspect of the presently disclosed technology, there is provided a method for holding a bag in an open configuration for deposition of banknotes in the bag by banknote processing equipment during a banknote filling operation, the method comprising inserting a bag into a chamber forming part of banknote processing equipment and establishing a lower ambient pressure between the chamber and the bag to that within the bag to cause the bag to expand into the open configuration, whereby the banknote processing equipment can deposit banknotes in the bag.

In some instances, the lower ambient pressure between the chamber and the bag is established by extracting at least some of the atmosphere from the chamber after insertion of the bag into the chamber. The atmosphere may be air.

The method may further comprise clamping at least part of a free end of the bag against the chamber during the banknote filling operation.

The method may further comprise maintaining a passage for fluid flow between the chamber and bag after the bag has expanded into the open configuration. The passage of fluid flow may be maintained by preventing the bag from conforming to the interior shape of the chamber such that a gap exists between the bag and a side wall of the chamber.

In some examples, the method further comprises sealing the bag in a sealing operation occurring after the filling operation. The sealing operation may be a heat-sealing operation, although it may employ other means such as using a closure device, which may be integral with the bag.

The free end of the bag may release from the chamber after the filling operation and prior to the sealing operation.

The method may further comprise controlling the speed of operation of an extractor for establishing the lower ambient pressure between the chamber and the bag to a suitable speed for cooling a welded region of the bag during and/or after the sealing operation. This speeds up the overall cycle time since the welded region of the bag cools and solidifies more rapidly. It has been found that a six-second period of fan operation at full speed after the sealing operation is adequate to cool the welded region.

The method may further comprise reducing the speed of an extractor for establishing the lower ambient pressure between the chamber and the bag after the bag has expanded into the open configuration. This allows a lower speed to be maintained during the filling operation, thereby reducing energy consumption and the noise level. The speed may be reduced such that the extractor is stopped. The lower speed may be maintained until a new bag is loaded.

In accordance with a third aspect of the presently disclosed technology, there is provided method for filling a bag with banknotes, the method comprising holding a bag in an open configuration for deposition of banknotes in the bag by banknote processing equipment during a banknote filling operation according to the method of the second aspect of the presently disclosed technology, and depositing banknotes in the bag using the banknote processing equipment during the banknote filling operation.

Figure 2:
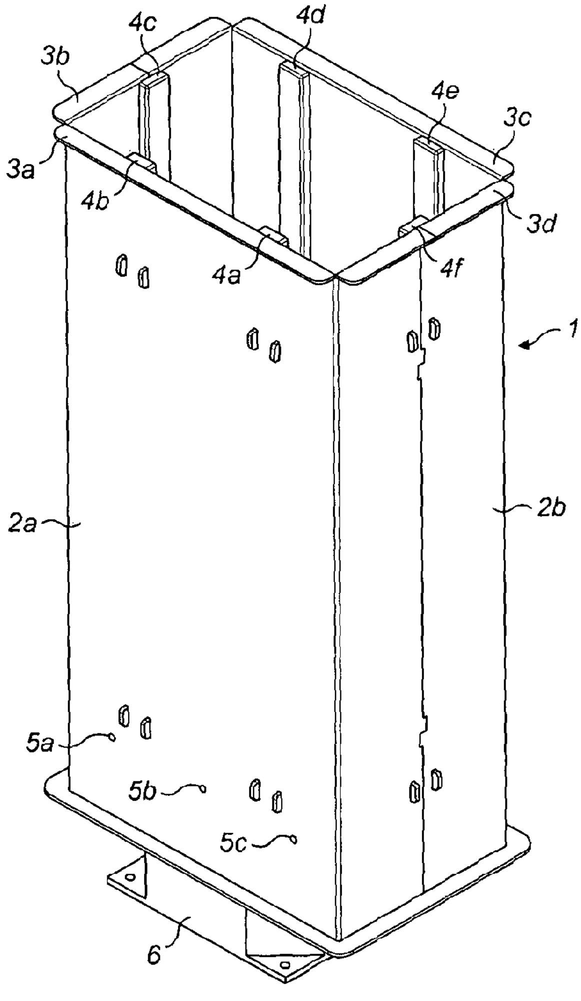
Figure 3:
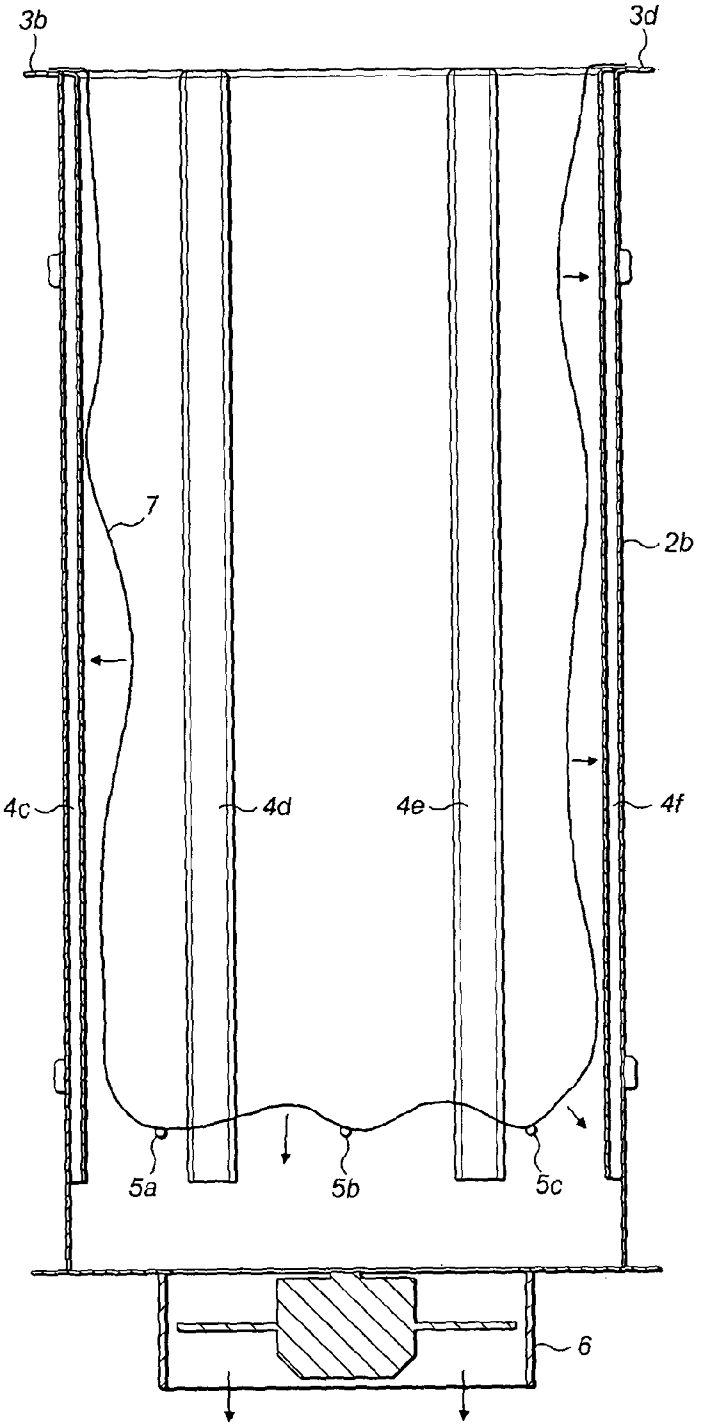

In the device shown in FIGS. 1 to 3, a chamber 1 is made from two sheet metal U-shaped parts 2*a*, 2*b* joined together along their longitudinal edges. The top edges of the chamber 1 are folded over to form flanges 3*a*-3*d*.

Six side rails 4*a*-4*f* are mounted to the chamber 1. The six side rails 4*a*-4*f* are affixed to the chamber 1 by way of tabs on the side rails 4*a*-4*f* that are passed through corresponding apertures in the chamber 1 and twisted to prevent them passing back through the apertures. The tabs on each of side rails 4*c*, 4*f* pass through apertures in both of the U-shaped parts 2*a*, 2*b* and thereby hold the two U-shaped parts 2*a*, 2*b* together.

Towards a lower end of the chamber three support rods 5*a*-5*c* pass through the chamber 1. An extractor fan 6 is mounted to the underside of the chamber 1.

To use the device, a bag 7 (see FIG. 3) is inserted through the open end of the chamber 1, that is the end of the chamber 1 adjacent the flanges 3*a*-3*d*. The free end (i.e. not the closed end) of the bag 7 is stretched over the flanges 3*a*-3*d* to hold it in place and the closed end of the bag 7 is allowed to rest on the support rods 5*a*-5*c*.

The extractor fan 6 is then started, drawing air through the chamber 1 from the open end adjacent the flanges 3*a*-3*d* to the opposed, base end where the extractor fan 6 is mounted and out through the fan 6 in the direction of the arrows shown in FIG. 3. This reduces the air pressure within the chamber 1 around the bag 7.

As a result of the reduction in pressure within the chamber 1 the bag 7 expands outwardly (as indicated by the arrows shown in FIG. 3) towards the side walls of the chamber 1. Thus, the bag 7 adopts an open configuration in which banknotes can be deposited simply by releasing them above the free end of the bag 7 such that they fall under gravity to rest on the closed end of the bag 7. The support rods 5*a*-5*c* provide support to prevent the bag 7 being drawn into the extractor fan 6 and for the banknotes deposited in the bag 7.

Once the bag is in the open configuration, the speed of extractor fan 6 may be reduced. This is achieved by a speed controller (not shown) which controls the speed of extractor fan 6 in response to a speed control signal. The speed control signal may be issued by a master controller in an item of banknote processing equipment (for example, banknote sorting or counting equipment) to which the device shown in FIGS. 1 to 3 is fitted. The speed of the extractor fan 6 may be reduced to a dead stop. This speed-reduction feature reduces the noise of operation and power consumption of the device.

The side rails 4*a*-4*f* prevent the bag 7 from conforming entirely to the shape of the interior of the chamber 1 when it expands into the open configuration. Instead, the bag expands against the side rails 4*a*-4*f* and the side walls of the chamber 1 between the side rails 4*a*-4*f*. This results in air channels of approximately triangular cross-section being formed between the bag 7, the side walls of the chamber 1 and the side rails 4*a*-*f*. Thus, the passage of air through the chamber 1 and extractor fan 6 is maintained even when the bag 7 is in the open configuration, which prevents the extractor fan 6 being overworked and potentially overheating.

The device forms part of an item of banknote processing equipment, such as a banknote deposit safe, a cash dispenser, a banknote sorter or banknote counter. In some cases, more than one device may be fitted to the same piece of equipment. It is then possible to use a single fan coupled to each device to reduce the pressure in each chamber simultaneously or, with a suitable system of baffles, selectively in each chamber.

Figure 4:
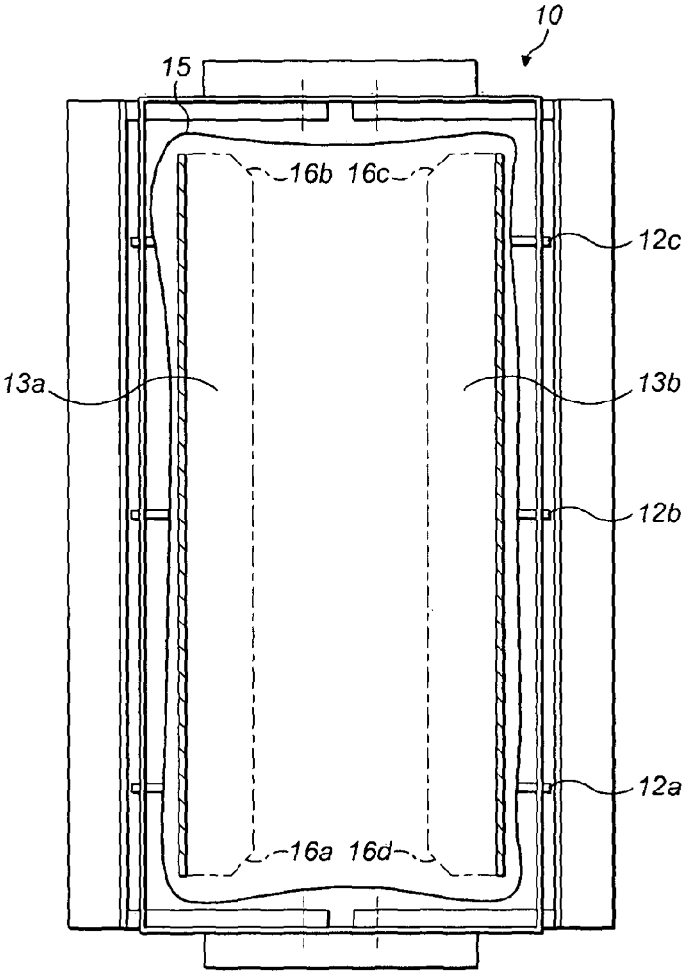
FIGS. 4 to 6 show plan, cross-sectional and side views of a second implementation of the presently disclosed technology.
Figure 5:
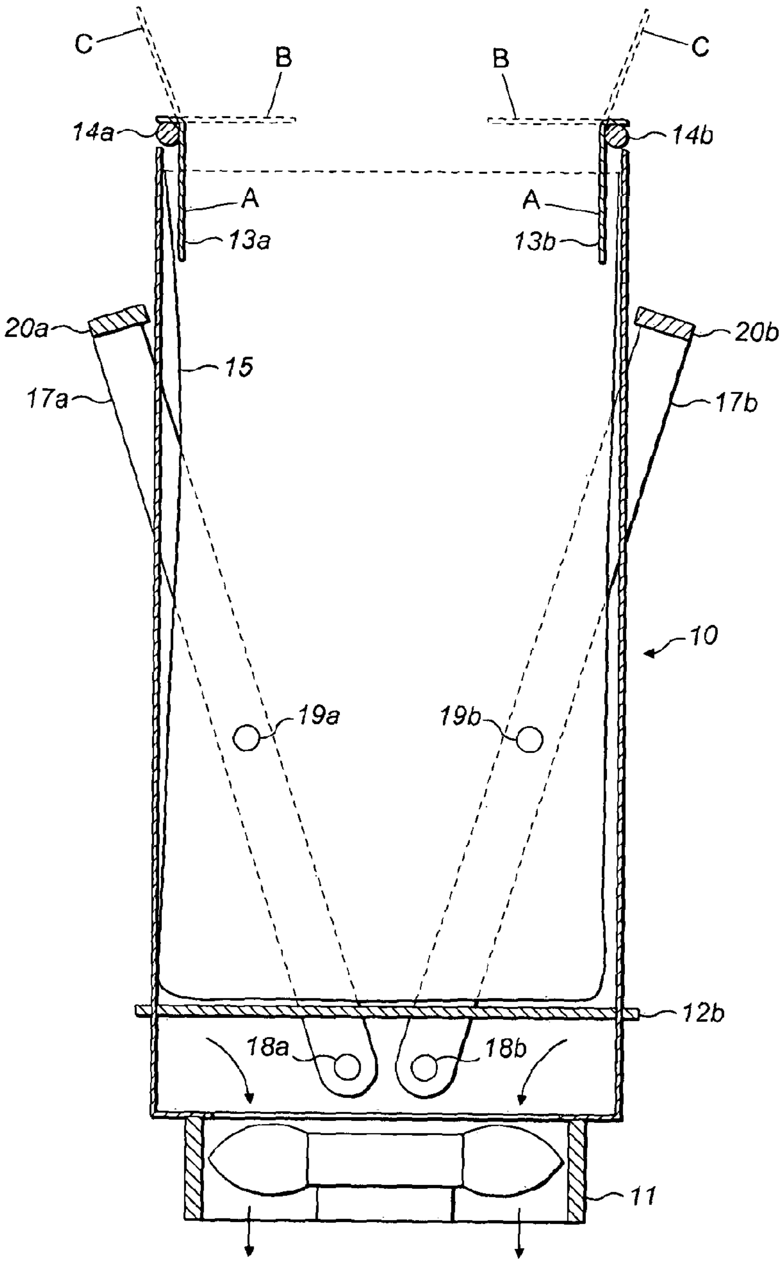

FIGS. 4 and 5 show plan and side cross-sectional views of a second implementation of the presently disclosed technology, Generally, the structure of the second implementation is the same as that of the first implementation described above with reference to FIGS. 1 to 3. However, there are some important additions as will become apparent.

A chamber 10 has an open end for receiving bags and an extractor fan 11 mounted on the underside of the chamber 10. The extractor fan 11 is able to draw air through the open end, through the chamber 10 and out through the base end (opposite to the open end) as shown by the arrows. Three support rods 12*a*-12*c* pass through the chamber 10 near its base end. The arrangement so far is identical to that of the first implementation, the extractor fan 11 and support rods 12*a*-12*c* performing the same functions as the equivalent extractor fan 6 and support rods 5*a*-5*c* of the first implementation. These functions have already been described above. However, the second implementation also comprises a sealing mechanism and a clamping arrangement.

The clamping arrangement comprises a pair of flaps 13*a*, 13*b*, each disposed on a long edge of the open end of the chamber 10. The flaps 13*a*, 13*b* are rotatable around respective hinges 14*a*, 14*b* running along the long edges of the chamber 10. They are able to move between the positions indicated as A and C (in dashed lines), and can be held at the interim position indicated as B (also in dashed lines) by detents.

When the flaps 13*a*, 13*b* are in position C, an operator is able to load a bag 15 into chamber 10. In position A, the flaps 13*a*, 13*b* clamp the bag 15 to the chamber 10 by engaging the inner surfaces of bag 15 and applying a clamping force to the bag 15 pushing it against the side walls of the chamber. This not only holds the bag 15 in the correct configuration to allow deposition of banknotes in the bag 15, it also provides a well-defined opening into the bag 15 so that banknotes do not collide with the open end of the bag 15 as they are deposited.

As best seen in FIG. 4, the flaps 13*a*, 13*b* have chamfered corners 16*a*-16*d* on their leading edges. This prevents the corners catching on the bag 15 as the flaps 13*a*, 13*b* are moved into position A to engage the bag 15. An alternative design for the flaps 13*a*, 13*b* could have curved leading edges.

The flaps 13*a*, 13*b* occupy effectively the full width of the chamber to force the bag 15 open as much as possible along its entire width, thereby providing as wide an opening as possible. They are designed to have a width that is slightly less than the width of the bag 15 when open. The width of the flaps 13*a*, 13*b* may be around 3 mm to 5 mm less than the width of the bag 15 when open.

The sealing mechanism comprises a pair of sealing arms 17*a*, 17*b* mounted to the chamber 10 on pivots 18*a*, 18*b*. Each sealing arm 17*a*, 17*b* is provided with a stub axle 19*a*, 19*b* to enable a force to be applied to the sealing arms 17*a*, 17*b* to draw them together and pull them apart. At the top of each sealing arm 17*a*, 17*b* is a sealing element 20*a*, 20*b*. The sealing elements 20*a*, 20*b* apply heat to the bag 15 when the sealing arms 17*a*, 17*b* are drawn together so that the sealing elements 20*a*, 20*b* engage the bag 15. This welds the sides of the bag 15 together, thereby closing the open free end.

The operation of this implementation is similar to the first implementation. The flaps 13*a*, 13*b* are moved manually to position C by an operator. The bag 15 is then inserted through the open end of the chamber 10. The extractor fan 11 is then started, drawing air through the chamber 10 from the open end to the base end where the extractor fan 11 is mounted and out through the fan 11 in the direction of the arrows shown in FIG. 5. This reduces the air pressure within the chamber 10 around the bag 15.

As a result of the reduction in pressure within the chamber 10, the bag 15 expands rapidly outwardly towards the side walls of the chamber 10. The bag 15 conforms approximately to the internal volume of the chamber 10, the side walls of which constrain further expansion of the bag 15. Thus, the bag 15 adopts the open configuration shown in FIG. 5. Even with a normal non-gusseted bag, the chamber 10 can cause it to open into a well-formed shape with a rectangular cross-section and a flat bottom suitable for receiving banknotes.

The flaps are then manually rotated to position C to clamp the free end of the bag 15 to the chamber 10 and to present a neatly-formed opening of the appropriate size to receive banknotes.

Banknotes can then be deposited simply by releasing them above the clamped free end of the bag 15 such that they fall under gravity to rest on the closed end of the bag 15. The support rods 12*a*-12*c* provide support to prevent the bag 15 being drawn into the extractor fan 11 and for the banknotes deposited in the bag 15.

Once the bag is in the open configuration, the speed of extractor fan 11 may be reduced. This is achieved by a speed controller which controls the speed of extractor fan 11 in response to a speed control signal. The speed control signal may be issued by a master controller in an item of banknote processing equipment (for example, banknote sorting or counting equipment) to which the chamber 10 is fitted. The speed of the extractor fan 11 may be reduced to a dead stop. This speed-reduction feature reduces the noise of operation and power consumption.

The chamber could be fitted with side rails similar to the side rails 4*a*-4*f* already described above with reference to the first implementation. These side rails have the same effect as already described, namely providing air channels of approximately triangular cross-section being formed between the bag 15, the side walls of the chamber 10 and the side rails. Thus, the passage of air through the chamber 10 and extractor fan 11 is maintained even when the bag 15 is in the open configuration, which prevents the extractor fan 11 being overworked and potentially overheating.

Figure 6:
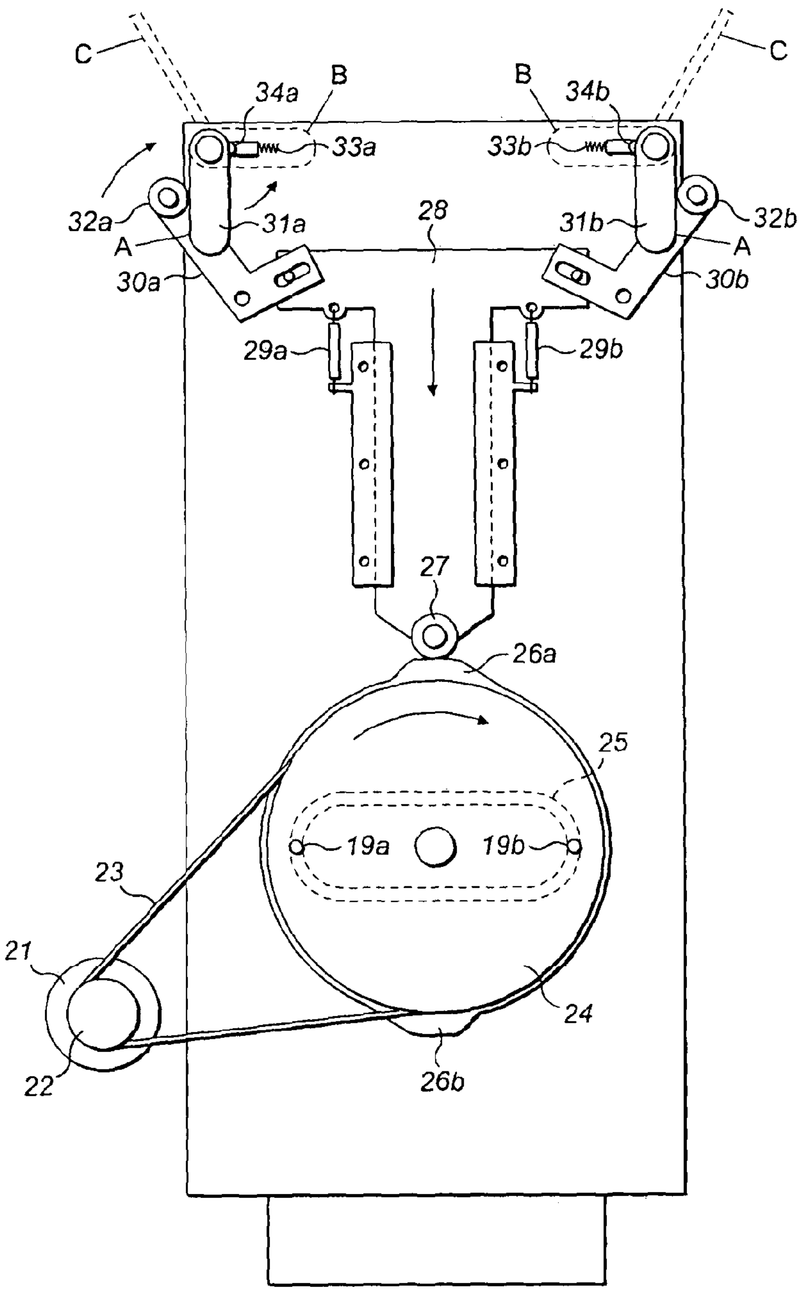

When the desired quantity of banknotes has been deposited in bag 15 by the banknote processing equipment to which chamber 10 is fitted, the flaps 13*a*, 13*b* are moved to position B and the sealing arms 17*a*, 17*b* are moved so that the sealing elements 20*a*, 20*b* engage the bag 15. The sealing elements 20*a*, 20*b* are then energized to weld the open free end of the bag 15, The movement of the flaps 13*a*, 13*b* to position B occurs automatically as the sealing arms 17*a*, 17*b* are moved so that the sealing elements 20*a*, 20*b* engage the bag 15. This is carried out by a mechanism shown in FIG. 6. Movement of the sealing arms 17*a*, 17*b* is caused by operation of a motor 21, coupled via a pulley 22 and belt 23 to a main cam 24. The main cam 24 has a "racetrack" groove in which the stub axles 19*a*, 19*b* of the sealing arms 17*a*, 17*b* are located. Thus, as the motor 21 rotates the main cam 24 through ninety degrees from the position shown in FIG. 6, the sealing arms 17*a*, 17*b* are brought together by the groove 25 acting on the stub axles 19*a*, 19*b*. A further ninety degree rotation of the main cam 24 causes the sealing arms 17*a*, 17*b* to be pulled apart, again by the groove 25 acting on the stub axles 19*a*, 1911 A pair of secondary cams 26*a*, 26*b* is provided on the periphery of main cam 24. A roller 27 bears on the peripheral surface of main cam 24 and follows its profile. When the secondary cams 26*a*, 26*b* are underneath it (as shown in FIG. 6), the roller 27 lifts the T-shaped member 28 against springs 29*a*, 29*b*. The T-shaped member is coupled to bellcranks 30*a*, 30*b*, and in this position these are moved out of the way so that the flap-operating levers 31*a*, 31*b* can occupy the position indicated as A in FIG. 6 (in which the flaps 13*a*, 13*b* are also in their position A).

However, when a sealing command is issued by a controller, the motor 21 is caused to rotate the main cam 24 through ninety degrees from the position it is shown to occupy in FIG. 6. This brings the sealing arms 17*a*, 17*b* together for the sealing operation as already described. It also allows the springs 29*a*, 29*b* to urge the T-shaped member 28 downwardly as the secondary cam 26*a* moves out of the way of roller 27. The T-shaped member thus pulls the bellcranks 30*a*, 30*b* inwardly so that rollers 32*a*, 32*b* (rotatably mounted on bellcranks 30*a*, 30*b*) push the flap-operating levers 31*a*, 31*b* (and hence flaps 13*a*, 13*b*) to position B. A pair of springs 33*a*, 33*b* and balls 34*a*, 34*b* form detents together with notches 35*a*, 35*b* in the flap-operating levers 31*a*, 31*b*. The balls 34*a*, 34*b* are urged into the notches 35*a*, 35*b* by springs 33*a*, 33*b* as the flap-operating levers 31*a*, 31*b* arrive at position B and hold them in that position.

After the sealing operation, the motor 21 is caused to rotate the main cam 24 through another ninety degrees, which returns the sealing arms 17*a*, 17*b*, T-shaped member 28 and bellcranks 30*a*, 30*b* to their original positions, as shown in FIG. 5. The flaps 13*a*, 13*b* will stay in position B due to the action of the above-mentioned detents on flap-operating levers 31*a*, 31*b*. This enables the operator to recover the bag straightforwardly, which is done by manually moving the flaps 13*a*, 13*b* to position C. The bag is then recovered and the system is ready to receive the next bag.

Optionally, the extractor fan 11 may be run for a period of a few seconds, such as six seconds, during and/or after the sealing elements 20*a*, 20*b* are energized. This helps to cool the welded region of the bag and speed up the cycle time.

The chamber 10 is mounted to or forms an integral part of banknote processing equipment, such as a banknote deposit safe, a cash dispenser, a banknote sorter or banknote counter. In some cases, more than one device may be fitted to the same piece of equipment. It is then possible to use a single fan coupled to each device to reduce the pressure in each chamber simultaneously or, with a suitable system of baffles, selectively in each chamber.

What is claimed is:

1. A method for depositing one or more banknotes into a bag, the method comprising:

positioning the bag in a chamber;

expanding the bag;

clamping a free end of the bag using a clamping arrangement;

receiving the one or more banknotes into the bag; and sealing the bag using a sealing operation which includes a sealing mechanism configured to move into engagement with the bag as the clamping arrangement releases the free end of the bag.

2. The method of claim 1, wherein clamping the free end of the bag includes moving one or more flaps of the clamping arrangement into a first position such that the free end of the bag is clamped against the chamber.

3. The method of claim 1, wherein expanding the bag includes by reducing an air pressure within the chamber around the bag.

4. The method of claim 1, wherein the chamber has an open end through which the bag is received.

5. The method of claim 4, further comprising releasing the free end of the bag from the chamber by moving one or more flaps of the clamping arrangement from a first position into a second position; wherein the sealing operation is after releasing the free end of the bag from the chamber.

6. The method of claim 1, wherein the one or more banknotes are received through the free end of the bag.

7. The method of claim 1, wherein the sealing mechanism includes a pair of sealing arms pivotably mounted to the chamber.

8. The method of claim 7, wherein the pair of sealing arms both include stub axles configured to draw the pair of sealing arms together and pull the pair of sealing arms apart.

9. The method of claim 7, wherein the sealing mechanism further includes one or more sealing elements disposed at a top of the pair of sealing arms to provide heat as part of the sealing operation.

10. The method of claim 1, wherein expanding the bag includes expanding the bag into an open configuration during a filling operation.

11. The method of claim 10, wherein the open configuration of the bag includes a rectangular cross section and a flat base.

12. The method of claim 1, wherein the clamping arrangement releases the free end of the bag responsive to one or more sealing arms of the sealing mechanism pushing against one or more flaps of the clamping arrangement.

13. The method of claim 1, wherein the sealing operation includes closing the free end of the bag through welding.

14. The method of claim 1, wherein the chamber forms part of at least one of a deposit safe, a cash dispenser, a note sorter, or a note counter.

15. A system for depositing one or more banknotes, the system including:

a chamber;

a sealing mechanism; and an open end of the chamber configured to receive a bag, the chamber is configured to expand the bag by a reduction in air pressure within the chamber, and the chamber is movable between:

an open configuration with the one or more banknotes receivable into the bag through a free end of the bag; and a sealed configuration with the bag sealed by the sealing mechanism.

16. The system of claim 15, further comprising:

a clamping arrangement configured to use one or more flaps to clamp the free end of the bag to the open end of the chamber in the open configuration.

17. The system of claim 16, wherein the sealing mechanism includes one or more sealing arms configured to move the bag from the open configuration to a released configuration by pushing a side of the bag against the one or more flaps.

18. The system of claim 15, wherein the bag has a free end configured to be clamped against the chamber.

19. The system of claim 15, wherein one or more flaps of the chamber in a first position in the open configuration and the one or more flaps are rotatable from the first position to a second position when the chamber is in the sealed configuration.

20. A system for depositing one or more banknotes, the system including:

a bag receivable into an open end of a chamber, the bag being movable between:

an open configuration with a free end of the bag clamped to the chamber by a clamping arrangement; and a sealed configuration with the free end of the bag being sealed shut by a sealing mechanism configured to move into engagement with the bag as the clamping arrangement releases the free end of the bag;

wherein the one or more banknotes are receivable into the bag through the free end of the bag when the bag is in the open configuration.

* * * * *